United States Patent [19]
Koo et al.

[11] Patent Number: 5,345,231
[45] Date of Patent: Sep. 6, 1994

[54] CONTACTLESS INDUCTIVE DATA-TRANSMISSION SYSTEM

[75] Inventors: Roland Koo; Gerald Holweg, both of Graz, Austria

[73] Assignee: Mikron Gesellschaft fur Integrierte Mikroelectronik mbH, Graz, Austria

[21] Appl. No.: 748,942

[22] Filed: Aug. 23, 1991

[30] Foreign Application Priority Data

Aug. 23, 1990 [AT] Austria .................. 1737/90

[51] Int. Cl.$^5$ ............................... G08C 19/02
[52] U.S. Cl. ............... 340/870.31; 340/825.3; 340/825.54; 340/825.63; 455/41
[58] Field of Search ............ 340/870.31, 825.54, 340/825.57, 825.62, 825.63, 825.64, 870.32, 870.34, 870.19, 825.3; 375/21, 22, 25; 332/106, 108, 109, 112; 455/41

[56] References Cited

U.S. PATENT DOCUMENTS

| | | | |
|---|---|---|---|
| 3,877,028 | 4/1975 | Thomas | 375/25 |
| 4,519,002 | 5/1985 | Amano | 340/825.63 |
| 4,742,470 | 5/1988 | Juengel | 340/825.54 |
| 4,796,028 | 1/1989 | MacKenthun et al. | 340/825.54 |
| 4,857,893 | 8/1989 | Carroll | 340/825.54 |
| 5,041,826 | 8/1991 | Milheiser | 455/41 |

FOREIGN PATENT DOCUMENTS

| | | |
|---|---|---|
| 373745 | 4/1982 | Austria . |
| 0245605 | 3/1987 | European Pat. Off. . |
| 0242906 | 4/1987 | European Pat. Off. . |
| 2530147 | 4/1975 | Fed. Rep. of Germany . |
| 3928561A1 | 8/1989 | Fed. Rep. of Germany . |
| WO88/03684 | 5/1988 | PCT Int'l Appl. . |
| WO89/05067 | 6/1989 | PCT Int'l Appl. . |
| 1505152 | 8/1975 | United Kingdom . |
| 2164825 | 9/1984 | United Kingdom . |
| 2149623 | 6/1985 | United Kingdom . |

*Primary Examiner*—John K. Peng
*Assistant Examiner*—Andrew Hill
*Attorney, Agent, or Firm*—Herbert Dubno

[57] ABSTRACT

A contactless inductive data transmission system provides bidirectional signal transfer between a sending-and-receiving station and one or more batteryless transponders. A high-frequency signal from the sending-and-receiving station is pulse width modulated for data transmission to a transponder and provides a system clock, which is extracted in both the sending-and-receiving station and in the transponder for synchronization, and provides the electrical power for operation of the transponder. The pulse width modulated signal is demodulated in the transponder for triggering a response wherein a modulating signal is applied by load modulation to the pulse width modulated high-frequency signal to form an information-carrying load modulated high-frequency signal, which is demodulated in the sending-and-receiving station.

12 Claims, 4 Drawing Sheets

CONTACTLESS INDUCTIVE DATA-TRANSMISSION SYSTEM

FIELD OF THE INVENTION

Our present invention relates to a contactless inductive data transmission system and, more particularly, to a system having at least one sending-and-receiving station and at least one transponder, whereby the sending-and-receiving station or stations can have means for the wireless transmission of an energy signal to the transponder, means for the transmission of a system clock to the transponder and means for data transfer to the transponder and the transponder has a rectifier for the received energy signal, a clock extractor to recover the clock for synchronization and a data storage for storing the data transmitted and, responding thereto.

BACKGROUND OF THE INVENTION

Data transmission and data interrogation between a sending-and-receiving station which may be stationary, and individual addressable transponders, which may be provided on vehicles or the like, can be used for a large number of applications and purposes. For example, it can be used for automatic toll collection or traffic control in systems in which, for example, vehicles are automatically debited for travel across a particular zone when a transponder on the vehicle passes a sending-and-receiving station at a toll collection point.

The transponder serves to identify the vehicle and access control systems can respond to identity indicia in a read only memory, for example, of the transponder. Depending on protocol selected and comparison of transponder data with fixed station data, individual access can be provided only to selected vehicles or individuals. Similar systems can be used to access controlled areas of workplaces, institutions or the like. In that case door opening facilities may respond to a transponder carried by the individual. In tool-change systems on machine tools or the like, the individual tools can be provided with transponders which can supply data representing the tool type, the duration of use, the source, data relating to machining-error correction, etc.

For all of the aforedescribed processes, it is known to provide sending-and-receiving stations which can communicate with the transponder by inductive means. The transponder can be inductively supplied with energy by a high energy signal from this station.

Heretofore, this energy was stored in a capacitor or condenser and served to activate an oscillator in the transponder to send back to the sending-and-receiving station data stored in the transponder.

Digital information transmission techniques require a clock transmission and synchronization of the units in communication with one another, i.e. between the transponders and the sending-and-receiving station.

A known data transmission signal allows the energy signal and the clock signal to be combined.

It is also known, by resonance network detuning at the antenna region of a transponder, to effect load modulation of a high frequency signal which can be detected in the sending-and-receiving station.

In all of these systems, however, improvement is desirable and, for example, as is especially the case for the transponder, a minimum size of the unit is desirable. Energy supply utilizing a condenser or capacitor sufficient to provide the energy needs of a transponder, for example, requires a relatively large capacitor. The presence of an oscillator for the retransmission of data from the transponder from the sending-and-receiving station limits the degree of miniaturization of the transponder which is possible.

Load modulation utilizing detuning of a resonant network, requires a resonant network sensitive to an exact resonant frequency and thus circuitry to maintain a given frequency.

Such circuitry also requires, for example, temperature compensation and the components necessary for temperature compensation occupy additional space. The uses of such systems because of different technical and legal requirements in different areas has been limited.

OBJECTS OF THE INVENTION

It is, therefore, the principal object of the present invention to provide a data transfer system for the purposes described and of the inductive wireless type which has a compact construction so that miniaturization, at least of the transponder, on a single chip is possible.

Another object is to provide a highly flexible data transfer system which satisfies all of the previously mentioned requirements and yet is free from drawbacks of the earlier systems.

SUMMARY OF THE INVENTION

These objects and others which will become apparent hereinafter are attained, in accordance with the invention, in a system in which energy, clock and data signals are all present in a single high frequency signal generated in the sending-and-receiving unit and which, for data transmission to the transponder, is pulse width modulated and of a frequency yielding the system clock and which can De preferably 100% amplitude modulated to form the energy carrier. According to the invention, this high frequency signal for data transmission from the transponder is load modulated by a modulating signal.

More particularly, the contactless inductive data transfer system, operating with a batteryless transponder can comprise: at least one sending-and-receiving station including:

means for generating a high-frequency signal, modulating means connected to the means for generating and imparting information-carrying pulse width modulation to the high-frequency signal, a source of clock signals for generating a system clock and imparting the system clock to the high-frequency signal, an inductor receiving the high-frequency signal for inductively transmitting same and for receiving a load-modulated signal representing load modulation at the transponder of high-frequency signal from the means for generating, thereby forming the load-modulated high-frequency signal, and a demodulator connected to the inductor for demodulating the load-modulated high-frequency signal and deriving received information therefrom; and at least one transponder energized by electrical power inductively transmitted from the sending-and-receiving station and including:

an inductive antenna for wireless inductive signal transfer with the inductor upon the transponder being within a communication range of the station, a rectifier connected to the inductive antenna for recovering from a pulse-width-modulated system-clock-carrying high-frequency signal received by the inductive antenna from the inductor of the sending-and-receiving station, an energy signal electrically energizing the transponder, a clock extractor connected to the inductive antenna for recovering from the pulse-width-modulated system-clock-carrying high-frequency signal received by the inductive antenna from the inductor of the station, a system clock at the transponder synchronizing same with the station, a data storage connected to the inductive antenna for recovering data from the pulse-width-modulated system-clock-carrying high-frequency signal received by the inductive antenna from the inductor of the station, and for storing data represented by pulse width modulation, and means connected with the inductive antenna for transmitting a modulating signal to the inductor to form the load-modulated high-frequency signal.

The HF signal generated in the sending-and-receiving station can be used for bidirectional information exchange with full duplexing and simultaneously serves as the energy transporter, the clock and the information transporter in the form of the pulse width modulated signal. The HF signal is load-modulated at the transponder to return information to the sending-and-receiving station from the transponder.

This technology enables miniaturization of the dimensions, especially of the transponder and by pulse width modulation and load modulation, permits data to be transmitted in opposite directions. Advantageously, the transponder can include an antenna circuit or network which is formed exclusively by one or more coils so as to be free from frequency dependency. Thus the antenna network is not, and does not form, part of any resonant network or circuit. By contrast to the state of the art, therefore, the invention does not make use of a frequency dependent resonant circuit. This means also that a fixed frequency need not be maintained permanently or that any particular frequency must be used. A chip for worldwide application can be used and different frequencies can be selected as need, location, regulations and specifications dictate, as long as the return of information from the transponder can be effected by load modulation. The coil or coils are preferably integrated in the transponder or the sending-and-receiving station circuitry which may be in the form of a single chip integrated circuit in which the active semiconductor topography is provided with the coil in one or more planes preferably applied by a photolithographic process. In this manner, the flat spatial requirement for the chip is not enlarged and the coil or coils can be integrated in or on the chip.

To transmit data from the memory of the transponder by means of load modulation to the sending-and-receiving station, it is advantageous to derive the carrier frequency of the modulating signal from the high frequency of the energy carrier by means of frequency division. In that case, the transponder may be provided with one or more frequency dividers. This reduces the circuitry significantly over that required for prior art transponders while simultaneously increasing the reliability.

As has already been noted, the data transmission system of the invention does not require a fixed frequency for the transponder circuit and the data from the memory is not transmitted directly but rather is transformed into a load modulated signal in the transponder and applied to a circuit which can include a modulation transistor for the loading or unloading of an inductor or partial inductor, for example, the antenna coil or a portion thereof for the ohmic loading of the latter.

During the blanking gaps of the pulse width modulated signals transmitted by the sending-and-receiving station to the transponder, no information is returned by load modulation and thus there can be no information losses. To insure a continued energy supply during these gaps at the transponder, we can bridge the blanking gaps of the energy carrier by providing a support capacitor or condenser in the energy supply circuit of the transponder. Since the gaps are short, the gap-bridging current-supply capacitor can be very small so that no space problems arise with respect to the topography of the chip.

To recover the data transmitted from the sending-and-receiving station, the antenna coil of the transponder is connected to a demodulator for the pulse width modulated signal which can include a pause or interval detector and a time or frequency counter to determine the signal length between pauses. This circuitry can include comparison circuitry for comparing the duration or the frequency count with a threshold value to differentiate between "0" and "1" signals.

Conversely, in the sending-and-receiving station a filter is provided in the demodulator connected to the antenna for the amplitude modulation load modulated carrier transmitted from the transponder so that a second demodulator step can convert the amplitude modulation signal into a bit stream, the message transmitted by the transponder. The modulator and demodulator of the sending-and-receiving station can be connected by an interface with a data-processing unit depending on the particular applications of the inductive wireless information transmission system.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
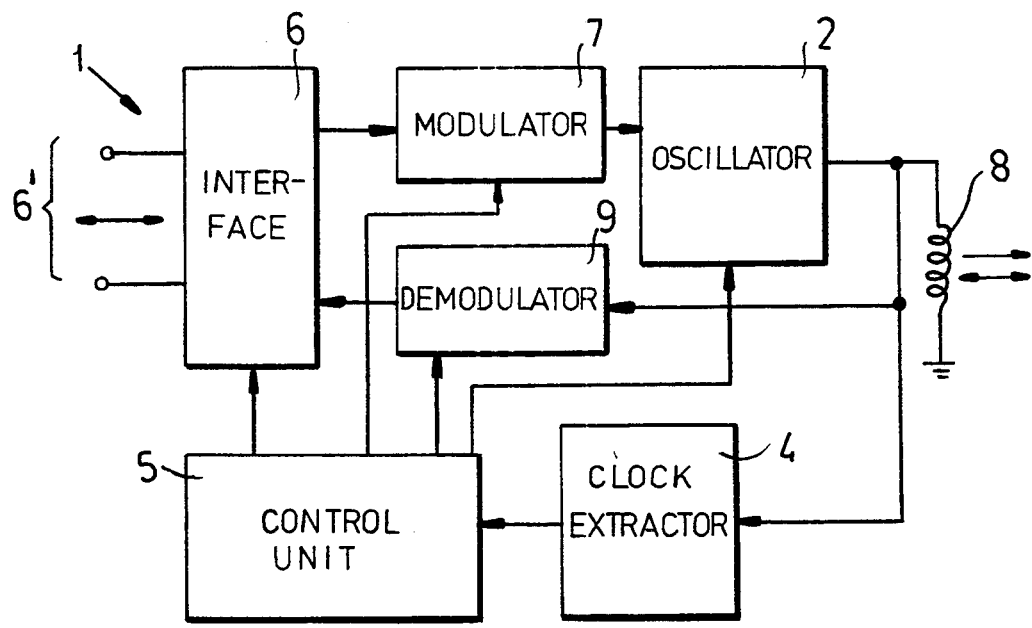
FIG. 1 is a block diagram of the sending-and-receiving station or unit of the invention.
Figure 2:
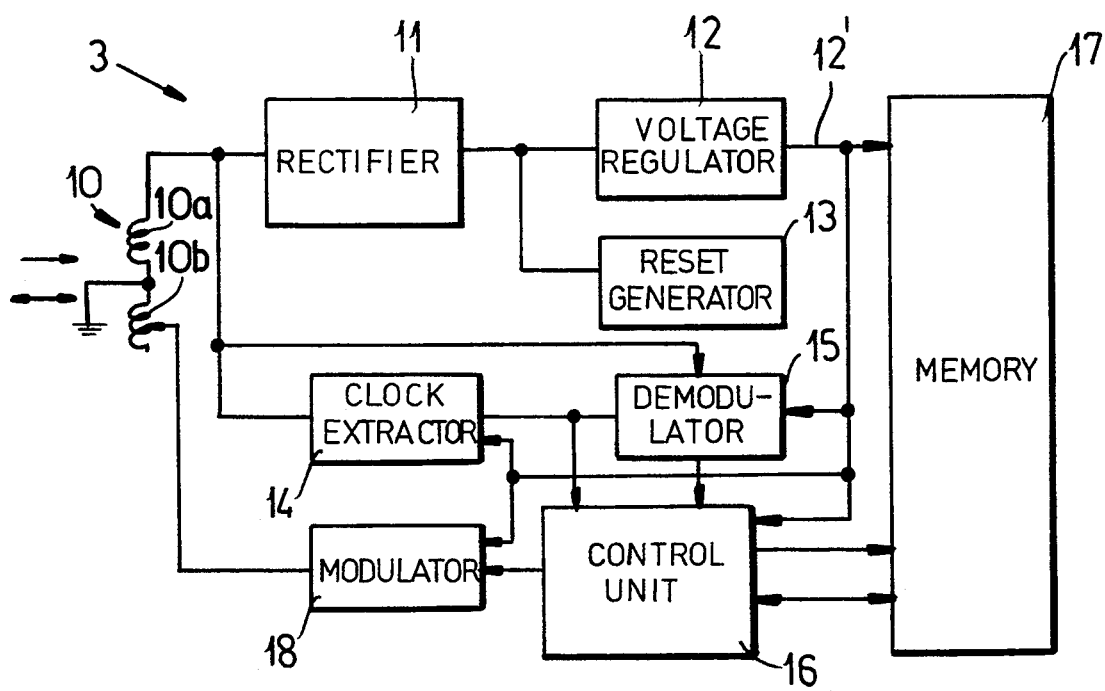
FIG. 2 is a block diagram of a transponder adapted to cooperate with the sending-and-receiving station of FIG. 1.

In FIG. 1, we have shown a sending-and-receiving station 1 which comprises an oscillator 2 and is capable of generating a high frequency (HF) signal for the simultaneous transmission of energy, clock and information to a transponder 3 (FIG. 2). The frequency of the HF signal carries the system clock (i.e. the time base) which serves as the time basis for the sending-and-receiving station as well as for synchronization of the transponder 3. This system clock is recovered from the high frequency signal of oscillator 2 in a clock extractor 4. A control unit 5 serves as the primary or dominant controller for the sending and transmission station 1 and can, consequently, supply control signals to the components thereof as may be required. The sending-and-receiving station 1 also supplies the HF signal which can be modulated up to 100% in amplitude modulation to the batteryless transponder 3 as the sole energy source for the latter.

The information to be transmitted is supplied via an interface 6 from a data processing system to which the interface may be connected by a bidirectional bus represented at 6'. The information supplied to the interface 6 from the memory of the data processing stage (not shown) is applied by a modulator 7 to the HF signal from the oscillator 2 in the form of a pulse width modulation.

This type of modulation, well known in data transmission, produces blanking gaps which separate larger or smaller of HF modulations or, as stated otherwise, precede and follow longer or shorter HF signals. The signal length following each blanking gap or the number of HF cycles following each blanking gap and prior to the next blanking gap, i.e. in a packet between blanking gaps, is a criteria for the 0 or 1 information levels of the data transmitted in the digital system.

Figure 3:
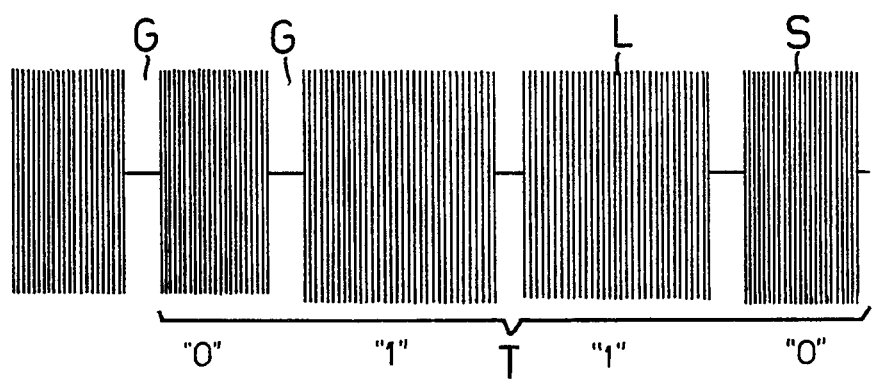
FIG. 3 is a diagram illustrating the pulse-width-modulated energy carrier.

The clock-carrying, energy transporting, pulse-width-modulated HF signal which can be outputted to the antenna coil 8 of the sending and receiving unit 1 has been illustrated in FIG. 3. The blanking gaps here are represented at G and, between blanking gaps, packets of HF oscillations are shown at L and S, respectively, representing long or short packets, respectively carrying the information "1" or "0" so that the data train T of FIG. 3 carries the information 0110 in the digital system by way of example. The energy required for operation of the transponder 3 corresponds to the integrated value of the entire signal as, of course, picked up by the receiving antenna 10 in the form of coils 10a, 10b as will be discussed below.

The circuit of FIG. 1 also includes a demodulator 9 which is employed for full duplex information transmission and bidirectional information transfer upon inductive coupling of the antenna coil 8 with the coils 10a, 10b and delivers its output to the interface 6 which, as previously noted, is also bidirectionally effective and can communicate the information developed by the demodulator 9 to the data processor.

The transponder (FIG. 2) has, as noted, an antenna 10 inductively couplable to the coil 8 and, connected thereto, a rectifier 11 and a voltage regulator 12 and a reset generator 13 blocking the operation of the transponder circuitry altogether when the voltage outputted by the voltage regulator falls below a predetermined minimum level. As represented by the lines 12', the regulated voltage, when the circuit is not blocked, services all of the other elements of the transponder.

Energy supply is effected, upon the approximation of a transponder, for example the transponder shown in FIG. 2, to the sending-and-receiving station 1 by the HF signals transmitted to the transponder.

The system clock supplied to the transponder 3 is extracted at a clock extractor 14 and the signal picked up by the antenna is demodulated at 15. The latter can include a pause or interval detector for determining the blanking gaps (FIG. 3) between the signal bundles L, S and a counter which can determine the durations of the signal groups L and S and can compare these signal durations with a threshold. Short signal groups whose number of oscillations or duration lie below the threshold, represent a "0" while longer signal blocks whose duration or number of cycles exceeds the threshold, represent a "1" in the digital information system. A control unit 16 can process the information and/or deliver the information to a memory 17. The control unit may be a microprocessor based or hardwired unit performing all of the requisite logic functions and sequencing functions required for the transponder.

Depending upon the use of the system, various data transmission protocols, data testing, access controls and other logical processes can be implemented. For example, in a toll system the information transmitted by the transponder and drawn from the memory 17 by the control unit 16 in response to the approach to the sending-and-receiving station enables the identification of a vehicle carrying the transponder to operate the toll station.

The data store or memory 17 can consist of EEPROM cells, RAM cells which can have support or maintenance batteries which do not contribute operable power or hardwiring options.

The data transmission system between one or more sending-and-receiving station 1 and preferably a greater number of transponders 3 operates bidirectionally with time-staggered information flow in both directions or in full duplex with simultaneous data transmission.

For this purpose, the transponder 3 has a modulator 18 connected to the control unit 16 and the memory 17 so that, based upon the system clock generated by the clock extractor 14, an information carrying modulating signal can be supplied to the modulation transistors and which deliver the information carrying load-modulated signal to the antenna coils 10a, 10b. The antenna coils, based upon the additional inductivity or the part of the coil supplied with the pulse code modulated HF frequency (system frequency), can transmit the signal to the antenna 8 of the sending-and-receiving station which is also bidirectionally operated.

Figure 4:
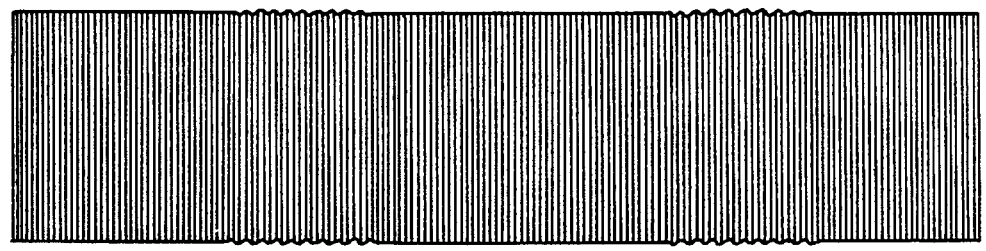
FIG. 4 is a diagram of the load-modulated energy carrier.

The change in inductivity resulting at the sending-and-receiving station modifies the pulse width modulated HF signal generated by oscillator 2 and a corresponding signal has been illustrated in FIG. 4 in which the carrier from oscillator 2 is shown to be partially amplitude modulated.

This amplitude modulation stems from the information dependent change in the loading resulting from the variable impedance of the antenna 10 attained by loading and unloading the antenna 10.

This has the advantage that the antennas for energy supply to the transponder are always available and the system can operate largely independently of frequency without the need for special means for maintaining a fixed frequency. In other words, the inductive antenna, for frequency independence of signals received thereby, is formed exclusively by at least one coil (10a and 10b).

The transponder 3 can be a mass produced item and all of the transponders can be identical in hardware terms without requiring adjustment or adaption for predetermined receiving frequencies.

Figure 7:
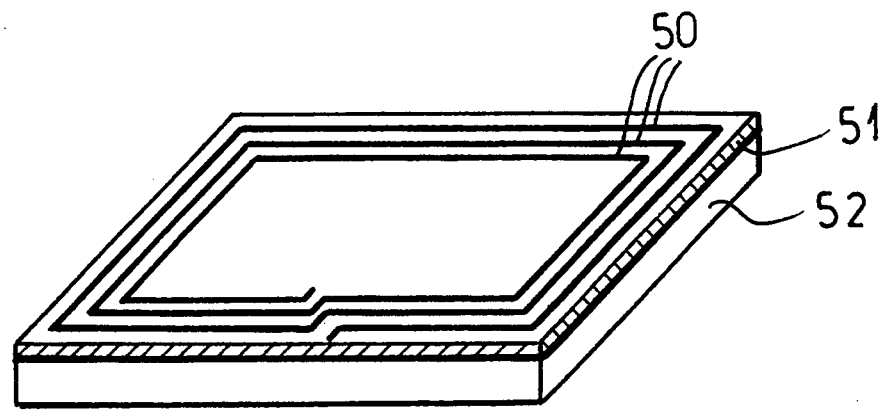
FIG. 7 is a perspective view of an integrated circuit, according to the invention having the turns of a planar antenna coil printed or photolithographically produced thereon.

The components (FIG. 7) can be photolithographically integrated including the antenna coils 50 which can be in a plane above the semiconductor topography 51 of a chip having a substrate 52.

Figure 5:
FIG. 5 is a diagram of the signal recovered by demodulation of the carrier of FIG. 4 following the first demodulation stage.
Figure 6:
FIG. 6 is a diagram of the signal resulting after the second demodulation stage.

The demodulator 9 of the sending-and-receiving station 1 can be equipped with a filter so that the load modulation picked up by the antenna coil 8, i.e. the high frequency signal of FIG. 4 can be regenerated to a signal train (FIG. 5) representing the information transmitted by the transponder to the sending-and-receiving station. A second demodulation stage, also included in the demodulator 9 can process this information train to provide a bit sequence of a digital signal train as has been illustrated in FIG. 6.

The information from the transponder and transmitted by the interface 6 to the data processor can trigger appropriate commands or functions. An information loop can determine the identity of the transponder address and identity for a handshake interaction with the transponder for triggering organizational, bookkeeping or technical responses and to trigger control or maintenance functions.

Figure 9:
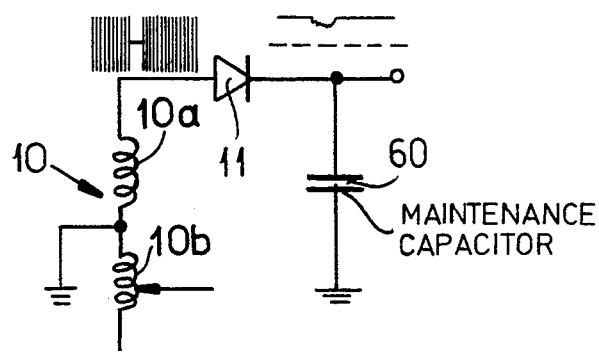
FIG. 9 is a circuit diagram showing the use of a current-maintenance capacitor for bridging the blanking gaps.

For energy supply to the transponder with high efficiency, the blanking intervals are so selected that they can be detected by the demodulator 15 on the one hand but that they do not interrupt the energy supply materially or, should the energy supply be interrupted, can have the intervals bridged by the supply of energy from a very small current-maintaining capacitor 60 (FIG. 9) which can be built into the voltage regulator 12 or connected upstream thereof. The bridging of the gaps in electrical energy supply do not pose a problem, since during these gaps, no clock signals are delivered to the transponder, no information is returned from the transponder and thus the energy requirement during these gaps are extremely small.

Figure 8:
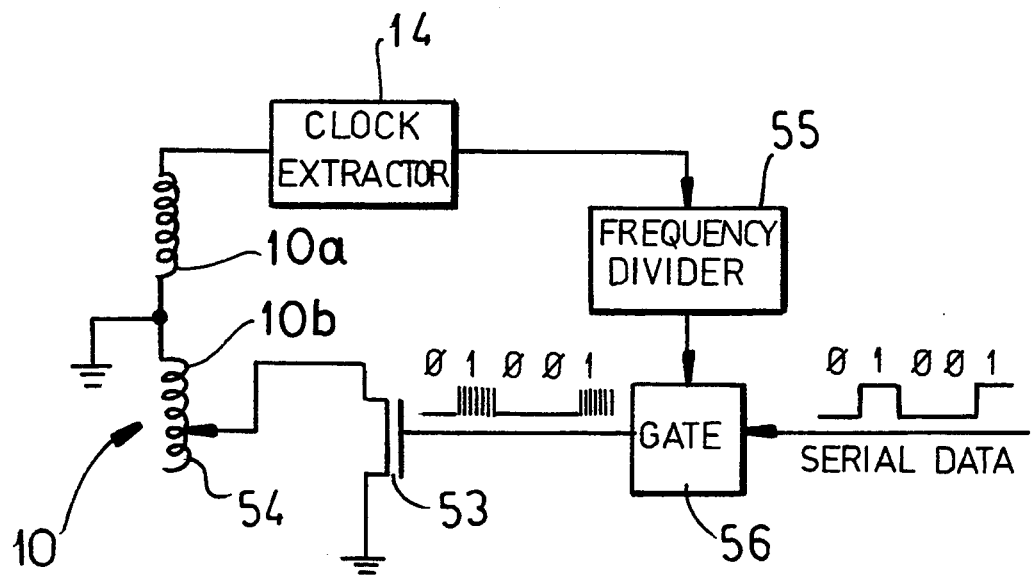
FIG. 8 is a circuit diagram of the use of a transistor at the output of the pulse code modulation stage for load modulation of the antenna for transmission from a transponder to the fixed station.

When within the range of the sending-and-receiving station 1, there are a number of transponders 3, the problem of individual transponder identification can arise. This identification can be effected by successive interrogations. As soon as the sending-and-receiving station 1 ascertains, based upon the attendance protocol, the presence of a plurality of transponders 3, the interrogations can commence, inquiring whether one of the transponders is a transponder from a half of the total number of transponders in the communication range of the sending-and-receiving station. This is effected utilizing an interrogation protocol transmitted by the sending-and-receiving station. If a transponder or a plurality of transponders from the interrogated group is triggered, they answer by transmission of their individual codes and respective test bits. If only one transponder replies, it is itself, by such reply already identified. If a number of transponders respond, there will be a synchronous superimposition of the answers which can be distinguished by the test bits. The sending-and-receiving station then commences a further interrogation whereby the interrogated group of transponders is reduced by half. This continues until only a single transponder answers. When no transponder responds to the interrogation, sectionalizing of the complementary transponder group is effected. If a transponder is identified, further identification of the same transponder can be limited by various criteria. For example, a time window can be defined during which a transponder can be identified only once. Alternatively, it can be set up such that the same transponder can be identified again only after all transponders within the communication range of the sending-and-receiving station have been identified. As can be seen from FIG. 8, the modulating signal is applied in the transponder to a switching device including a modulation transistor 53 for loading and unloading at least partially inductively at least a portion 84 of a coil forming the inductive antenna 10. A carrier frequency of the modulating signal is derived from a frequency divider 55 of the modulator 18 supplied with the high frequency signal of the pulse-width-modulated system-clock-carrying high-frequency signal received by the inductive antenna and is delivered to a gate 56 receiving serial data from the control unit 16.

Figure 10:
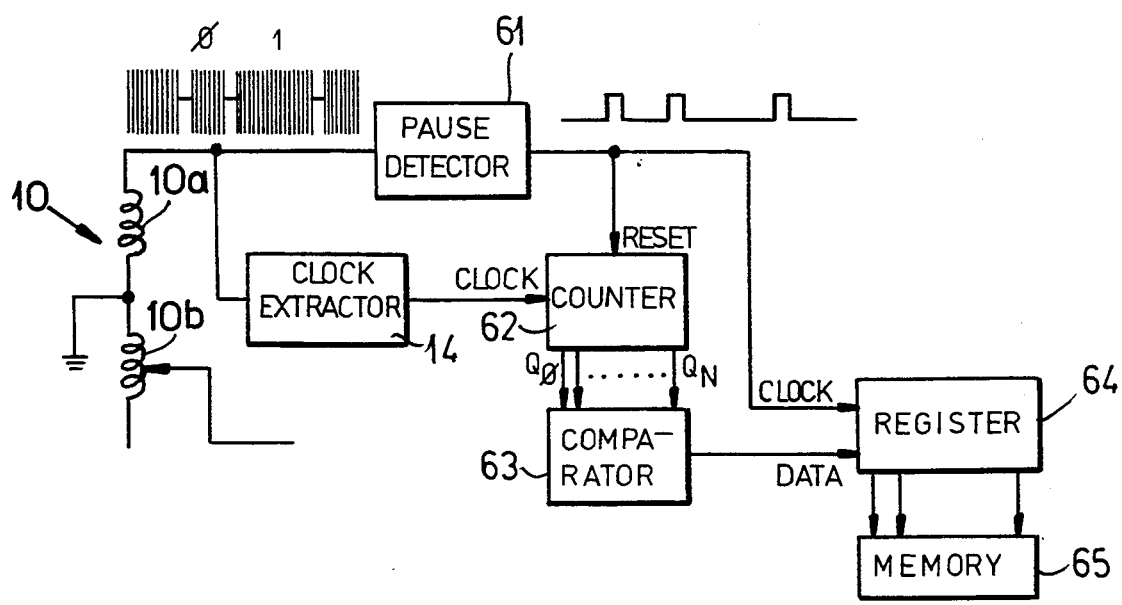
FIG. 10 is a block diagram of the demodulation and storage stage of the transponder according to the invention.

FIG. 10 shows a demodulation and storage circuit of the transponder. The demodulation circuit for the pulse-width-modulated system-clock-carrier high-frequency signal received by the inductive antenna 10 includes a pause detector 61 and a circuit, e.g. a counter 62 and a comparator 63 responsive to duration of a signal following a pause and comparing the duration with a threshold for differentiating between "0" and "1" signals forming the data stored in the data storage which can include a register 64 and the memory 65.

We claim:

1. A contactless inductive data-transmission system, comprising:
   at least one sending-and-receiving station including:
      means for generating a given high-frequency signal which defines a clock rate,
      modulating means connected to said means for generating for imparting information-carrying pulse width modulation with short even blanking intervals to said given high-frequency signal, thereby forming a pulse width modulated high-frequency signal,
   a source of clock signals for extracting a system clock from said given high-frequency signal,
   an inductor receiving said pulse width modulated high-frequency signal for inductively transmitting same and for receiving an information-carrying load-modulated high-frequency signal which is modulated by a modulating signal derived from said pulse width modulated high-frequency signal, said load modulation characterizing one logical value of a set of binary values "0" and "1" by a load modulation of the pulse width modulated high-frequency signal and the other logical value of said set being characterized by leaving the pulse width modulated high frequency signal unchanged, and
   a demodulator connected to said inductor for demodulating said load-modulated high-frequency signal and deriving received information therefrom; and
   at least one transponder energized by electrical power only inductively transmitted from said sending-and-receiving station in the form of said pulse width modulated high-frequency signal and including:

an inductive antenna coupled for wireless inductive signal transfer with said inductor upon said transponder being within a communication range of said station, a rectifier connected to said inductive antenna for recovering from said pulse width modulated high-frequency signal received by said inductive antenna from said inductor of said station, an energy signal electrically energizing said transponder, a clock extractor connected to said inductive antenna for recovering from said pulse width modulated high-frequency signal received by said inductive antenna from said inductor of said sending-and-receiving station, a system clock at said transponder synchronizing same with said sending-and-receiving station, a data storage connected to said inductive antenna for recovering data from said pulse width modulated high-frequency signal received by said inductive antenna from said inductor of said sending-and-receiving station, and for storing the recovered data represented by pulse width modulation, and means connected with said inductive antenna for load modulation of the pulse width modulated high-frequency signal by the modulating signal derived from the pulse width modulated high-frequency signal received by the inductive antenna for producing the information-carrying load-modulated high-frequency signal transmitted to said inductor.

2. The contactless inductive data-transmission system defined in claim 1 wherein said inductive antenna of said transponder, for frequency independence of signals received thereby, is formed exclusively by at least one coil.

3. The contactless inductive data-transmission system defined in claim 2 wherein said inductive antenna of said transponder has two coils in an integrated configuration of said transponder and are formed of concentric turns in at least one plane on a single chip above an active semiconductor topography.

4. The contactless inductive data-transmission system defined in claim 3 wherein said coils are formed by photolithographic transfer on said chip.

5. The contactless inductive data-transmission system defined in claim 1 wherein said transponder includes a frequency divider, and said modulating signal derived from said pulse width modulated high-frequency signal has a carrier frequency derived from said frequency divider from the pulse width modulated high-frequency signal received by said inductive antenna.

6. The contactless inductive data-transmission system defined in claim 1 wherein said modulating signal is applied in said transponder to a switching device including a modulation transistor for loading and unloading at least partially inductively at least a portion of a coil forming said inductive antenna.

7. The contactless inductive data-transmission system defined in claim 1 wherein said transponder includes a current supply maintenance capacitor for bridging blanking gaps in said pulse width modulated high-frequency signal received by said inductive antenna.

8. The contactless inductive data-transmission system defined in claim 1 wherein said transponder includes a demodulator for demodulating said pulse width modulated high-frequency signal received by said inductive antenna and including a pause detector and a circuit responsive to duration of a signal following a pause and comparing said duration with a threshold for differentiating between "0" and "1" signals forming the data stored in said data storage.

9. The contactless inductive data-transmission system defined in claim 1 wherein said means for generating of said sending-and-receiving station includes an oscillator for generating said given high frequency signal and said inductor is an antenna connected to said oscillator, said modulating means of said sending-and-receiving station including a modulator connected to a data processor for pulse width modulation of the signal produced by said oscillator.

10. The contactless inductive data-transmission system defined in claim 1 wherein said demodulator of said sending-and-receiving station has a first demodulation stage and a filter for demodulating the load-modulated high-frequency signal and obtaining a modulation frequency, and a second demodulating stage for producing a bit stream upon the demodulation of the load-modulated high-frequency signal.

11. The contactless inductive data-transmission system defined in claim 10 wherein said modulating means and said demodulator of said sending-and-receiving station are connected to an interface and by said interface are connectable to a data processor.

12. The contactless inductive data-transmission system defined in claim 9 wherein said modulating means and said demodulator of said sending-and-receiving station are connected to an interface and by said interface are connectable to a data processor.

* * * * *